United States Patent
Harvey et al.

(10) Patent No.: US 11,739,795 B2
(45) Date of Patent: Aug. 29, 2023

(54) INNER SPLINE WITH TOP LAND DRAINAGE HOLE

(71) Applicant: PRATT & WHITNEY CANADA CORP., Longueuil (CA)

(72) Inventors: Daniel Harvey, Contrecoeur (CA); Roberto Brito, Beloeil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 545 days.

(21) Appl. No.: 16/923,048

(22) Filed: Jul. 7, 2020

(65) Prior Publication Data

US 2022/0010842 A1 Jan. 13, 2022

(51) Int. Cl.
*F16D 1/10* (2006.01)
*F01D 25/18* (2006.01)

(52) U.S. Cl.
CPC ............... *F16D 1/10* (2013.01); *F01D 25/18* (2013.01); *F16D 2001/103* (2013.01); *F16D 2300/06* (2013.01); *Y10T 403/7035* (2015.01)

(58) Field of Classification Search
CPC .......... F01D 25/18; F01D 25/183; F16D 1/10; F16D 2001/103; F16D 3/185; F16D 2300/0214; F16D 2300/06; F16D 1/101; Y10T 403/559; Y10T 403/7026; Y10T 403/7028; Y10T 403/7031; Y10T 403/7032; Y10T 403/7033; Y10T 403/7035; Y10T 74/19995; F16H 57/043
USPC ........................................................ 184/6.12
See application file for complete search history.

(56) References Cited

U.S. PATENT DOCUMENTS 3,424,022 A * 1/1969 Greenberg .......... F16H 57/0431
  74/468
3,602,535 A * 8/1971 Behning ................... F16D 1/06
  464/158
3,834,248 A * 9/1974 Caliri .................... F16F 15/162
  74/467

(Continued)

FOREIGN PATENT DOCUMENTS

CN    207195601    4/2018
DE    102010040745    3/2012

(Continued)

OTHER PUBLICATIONS

Extended European Search Report, EP21174755.5, dated Oct. 28, 2021.

*Primary Examiner* — Josh Skroupa
*Assistant Examiner* — Kevin J Baynes
(74) *Attorney, Agent, or Firm* — NORTON ROSE FULBRIGHT CANADA LLP

(57) ABSTRACT

A spline coupling comprises a male spline member having male spline teeth and a female spline member having female spline teeth complementary to and engaged with the male spline teeth. One or more of the female spline teeth has a tooth height lesser than a tooth height of another one or more of the female spline teeth. The tooth height of the one or more of the female spline teeth is defined by a top land surface of the one or more of the female spline teeth. The tooth height of the other one or more of the female spline teeth is defined by a top land surface of the other one or more of the female spline teeth. A drainage hole in the top land surface of the one or more of the female spline teeth passes through the one or more of the female spline teeth.

11 Claims, 3 Drawing Sheets

(56) References Cited

U.S. PATENT DOCUMENTS

| | | | |
|---|---|---|---|
| 3,889,489 A | 6/1975 | Casey et al. | |
| 4,961,669 A * | 10/1990 | Itoh | F16D 3/06 |
| | | | 184/6.12 |
| 5,906,135 A * | 5/1999 | Prater | B23P 11/005 |
| | | | 403/375 |
| 7,736,083 B2 * | 6/2010 | Lescure | F16D 1/101 |
| | | | 403/359.1 |
| 8,052,535 B2 * | 11/2011 | Miyawaki | B62D 1/185 |
| | | | 384/42 |
| 8,196,489 B2 * | 6/2012 | Paluncic | F04C 2/084 |
| | | | 74/468 |
| 8,387,754 B2 * | 3/2013 | Konig | F16H 57/0478 |
| | | | 184/6.12 |
| 9,279,458 B2 * | 3/2016 | Nixon | F16D 1/0858 |
| 9,441,678 B2 * | 9/2016 | Nelson | F16D 9/06 |
| 10,047,806 B2 * | 8/2018 | Hodge | F16D 13/72 |
| 10,363,814 B2 * | 7/2019 | Sullivan | B60K 23/0808 |
| 2017/0122421 A1 | 1/2017 | Frait et al. | |

FOREIGN PATENT DOCUMENTS

| | | | | |
|---|---|---|---|---|
| DE | 102015216270 A1 * | 3/2017 | | F16D 13/58 |
| FR | 1218011 A * | 5/1960 | | F16D 13/58 |

* cited by examiner

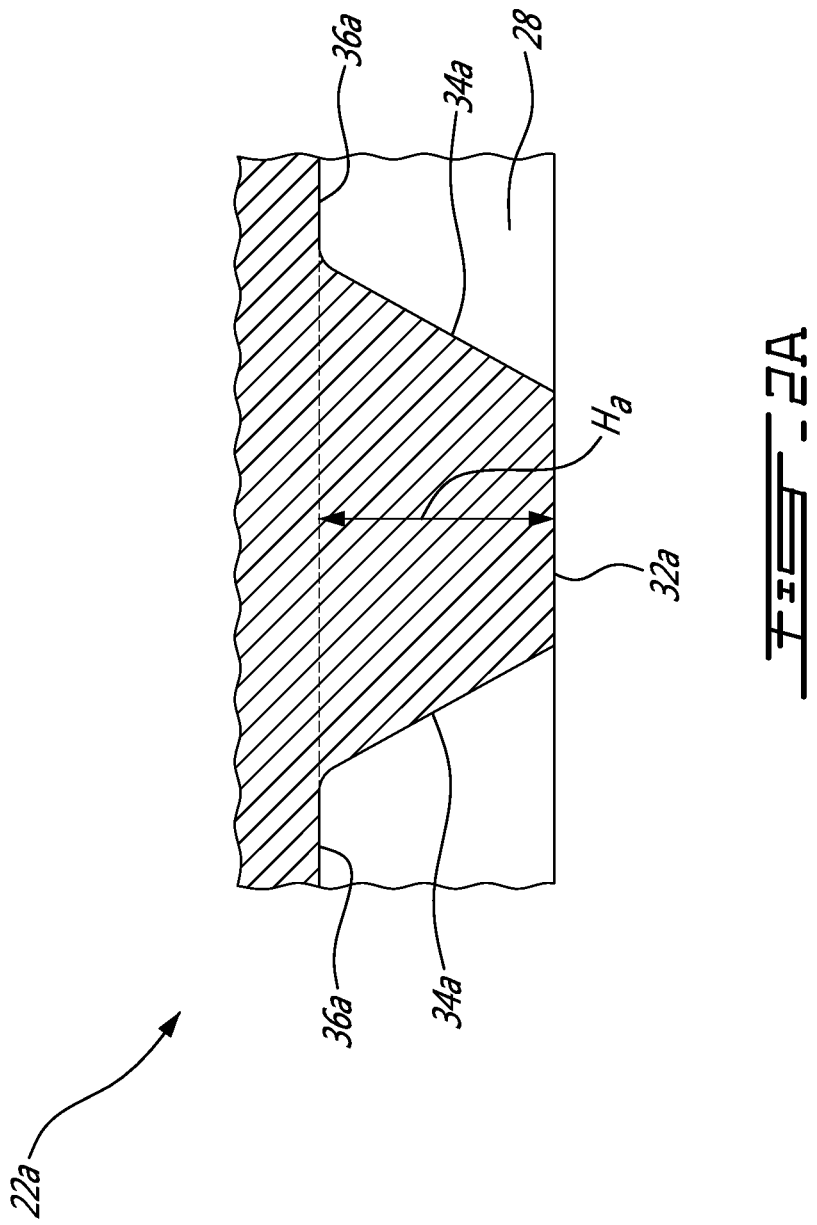

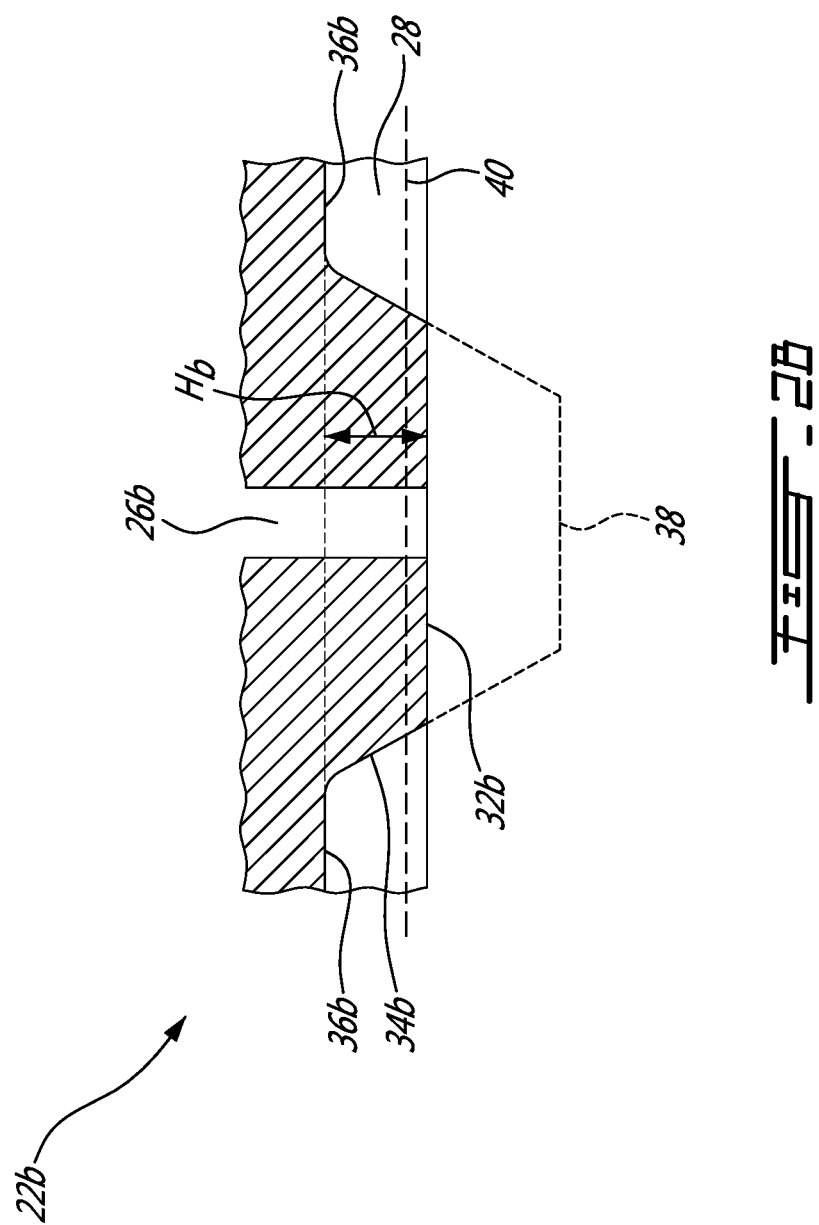

INNER SPLINE WITH TOP LAND DRAINAGE HOLE

TECHNICAL FIELD

The application relates generally to transmissions and, more particularly, to spline couplings.

BACKGROUND OF THE ART

Spline couplings are typically used in transmissions, for instance in gas turbine engines, to transmit torque from one rotating element to another. In some conditions, the contact surfaces between complementary spline teeth of the male and female portions of the spline coupling must be lubricated, for instance due to relative movements between these portions.

SUMMARY

In one aspect, there is provided a spline coupling comprising a male spline member having a plurality of male spline teeth, a female spline member having a plurality of female spline teeth complementary to and engaged with the plurality of male spline teeth, one or more of the plurality of female spline teeth having a tooth height that is lesser than a tooth height of another one or more of the plurality of female spline teeth, the tooth height of the one or more of the plurality of female spline teeth defined by a top land surface of the one or more of the plurality of female spline teeth, the tooth height of the other one or more of the plurality of female spline teeth defined by a top land surface of the other one or more of the plurality of female spline teeth, and a drainage hole in the top land surface of the one or more of the plurality of female spline teeth and passing through the one or more of the plurality of female spline teeth.

In another aspect, there is provided a female spline member for a spline coupling, comprising a plurality of female spline teeth each having a substantially similar tooth height defined by a top land surface of the plurality of female spline teeth, and at least one or more additional female spline tooth teeth having a lesser tooth height that is lesser than the tooth height of the plurality of female spline teeth and a top land surface having an opening to a drainage hole, the tooth height of the one or more additional female spline teeth defined by the top land surface of the one or more additional female spline teeth.

In a further aspect, there is provided a method for lubricating a spline coupling, comprising injecting a lubricating fluid into the spline coupling, circulating the lubricating fluid through a space between a plurality of male spline teeth rotatably interlocking a plurality of female spline teeth, and evacuating the lubricating fluid through at least one or more drainage holes in a top land surface and through at least one or more of the plurality of female spline teeth having a lesser tooth height that is lesser than a tooth height of the another of the plurality of female spline teeth.

Further in accordance with the third aspect, for instance, the method further comprises sealing a distal end of the spline coupling via an O-ring.

Further in accordance with the third aspect, for instance, injecting a lubricating fluid into the spline coupling includes jetting lubricating oil into the spline coupling via an oil jet.

Further in accordance with the third aspect, for instance, evacuating the lubricating fluid includes evacuating the lubricating fluid through a drainage hole in a top land surface of one of nine female spline teeth having a the lesser tooth height that is lesser than the tooth height of the other eight of nine female spline teeth.

Further in accordance with the third aspect, for instance, evacuating the lubricating fluid includes evacuating the lubricating fluid through two drainage holes in the top land surfaces of two of eighteen female spline teeth having lesser tooth heights that are lesser than the tooth heights of the other sixteen of eighteen female spline teeth.

DESCRIPTION OF THE DRAWINGS

Reference is now made to the accompanying figures in which:

FIGS. 2A and 2B are schematic cross sectional views of different female spline teeth taken along the line II-II in FIG. 1.

DETAILED DESCRIPTION

Figure 1:
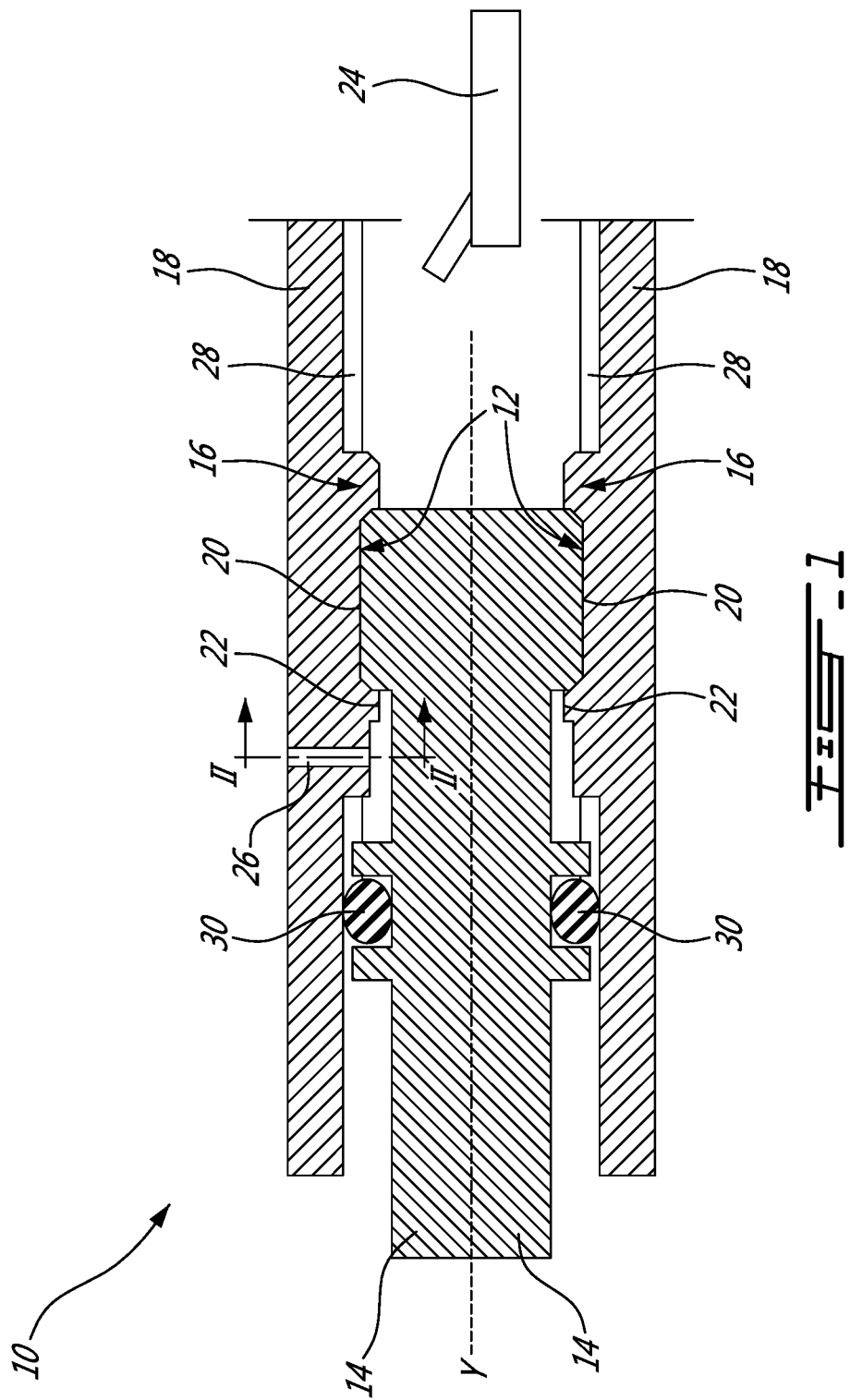
FIG. 1 is a schematic sectional view of a lubricated spline coupling in accordance with an embodiment of the present disclosure.

The creators of the present technology have examined existing lubrication arrangements, such as lubricating fluids such as oil often being supplied at one end of the spline coupling and drained via drainage holes at another end. These drainage holes may be located outside of the spline teeth or through one or more of the spline teeth.

Upon analysis, the creators of the present technology have found that during operation of the transmission, centrifugal forces typically force the oil to stick to the bottoms of the female spline teeth. As such, drainage holes may be drilled through one or more top lands of the female spline teeth to drain the lubricating oil that is fed to the other end of the spline coupling. While it may be desired to terminate each drainage hole on a flat top land surface of a given spline tooth rather than on a flank of the spline tooth, the minimum diameters of these drainage holes may be too great to accomplish this. These drainage holes typically have minimum diameters, either due to drilling constraints or to ensure sufficient drainage, and the widths of the flat top lands of the spline teeth may be too narrow to fully accommodate these drainage holes. This may result in top lands with sharp edges, or, in the case of a drainage hole with a diameter greater than the width of the top land, a drainage hole that is partially or fully drilled into the spline tooth's flank, which may lead to an undesirable oval-shaped aperture. In view of these findings, the creators of the present technology have developed a different type of spline connection.

Referring to FIG. 1, there is shown an embodiment of a lubricated spline coupling 10 between a male spline member 12 of an exterior surface of a shaft, for instance a drive shaft 14, and a female spline member 16 of an interior surface of a shaft, for instance in a gearbox 18 of a gas turbine engine or of other environments in which torque is transmitted between shafts. The gearbox 18 may be used, for instance, in gas turbine engines of aircrafts or other vehicles. The male spline member 12 includes a plurality of male spline teeth arranged about the exterior surface of the drive shaft 14, while the female spline member 16 includes a plurality of female spline teeth arranged about the interior surface of the coupling inside the gearbox 18, interior referring to the fact that the surface is inside a cavity of the female spline member 16. As such, the male spline member 12 may be referred to as an external spline coupling while the female spline member 16 may be referred to as an internal spline coupling. Illustratively, rotational axis Y bisects the spline coupling 10 through the center of male spline member 12. To transmit torque from the gearbox 18 to the drive shaft 14, the male spline teeth and female spline teeth are complementary for coupling engagement therebetween. Although the male spline member 12 is illustrated as being on the driven end of the drive shaft 14, in other instances the male spline member 12 could instead be on the driving end of the spline coupling 10. The above-described spline coupling 10 between the drive shaft 14 and the gearbox 18 is exemplary in nature, as other applications of spline couplings 10 may be considered in the present disclosure, for example to transmit torque between other types of exterior shafts 14 and interior shafts 18.

The male spline member 12 of the shaft 14 is engaged with the female spline member 16 of the shaft 18. The male spline member 12 includes a plurality of male spline teeth 20, while the female spline member 16 includes a plurality of female spline teeth 22. The female spline teeth 22 are complementary to the male spline teeth 20 for coupling engagement therebetween to transmit torque from the exterior shaft 14 to the interior shaft 18, or vice versa. The coupling engagement is achieved by aligning the male spline teeth 20 with the grooves between the female spline teeth 22, and by translating the male spline member 12 into the female spline member 16, such that the male spline teeth 20 and female spline teeth 22 are intercalated. The number, shape, material and pitch diameter of the male spline teeth 20 and female spline teeth 22 may vary depending on a number of factors such as the specific application in which the spline coupling 10 is used. For instance, for a greater magnitude of torque being transmitted, a greater number of spline teeth made from stronger materials may be required.

The spline coupling 10 is lubricated for various purposes, for instance to account for relative movement between the male spline teeth 20 and female spline teeth 22. A lubricating fluid injector 24 thus provides a lubricating fluid to a first or proximal end of the spline coupling 10 relative to the lubricating fluid injector 24. Although one fluid injector 24 is shown, in other embodiments additional fluid injectors 24 may be provided to distribute additional lubricating fluid to different areas of the spline coupling 10. The lubricating fluid may be selected from various oils or other lubricating fluids depending on the application in which the spline coupling 10 is used. For instance, the selected materials and operational temperatures may play a role in the choice of lubricating fluid. The lubricating fluid injector 24 may also be referred to as an oil jet or an oil injector in the various embodiments in which oil is the chosen lubricating fluid. The lubricating fluid circulates through the spline coupling 10, i.e. through a space between the various male spline teeth 20 and female spline teeth 22, until it reaches a second or distal end of the spline coupling 10 relative to the lubricating fluid injector 24, at which point it is evacuated through one or more drainage holes 26. As will be discussed in further detail below, the drainage hole(s) 26 is/are drilled through the female spline member 16, through one or more of the female spline teeth 22. In the various embodiments in which more than one drainage hole 26 is present, the drainage holes 26 may be distributed along the length of the female spline member 16. Alternatively, the drainage holes 26 may be grouped together towards the second or distal end of the spline coupling 10 to ensure that the lubricating fluid passes through a majority of the male spline teeth 20 and female spline teeth 22 before being evacuated from the spline coupling 10.

The oil level 28 in the spline coupling 10 may depend on various factors such as the quantity of oil being injected by the oil injector 24, the rotational velocity at which the spline coupling 10 is rotating, the pitch diameters of the male spline teeth 20 or female spline teeth 22 or the centrifugal forces causing the oil to stick to the bottoms of the male spline teeth 20 or female spline teeth 22. Illustratively, only one half of the spline coupling 10 is shown in FIG. 1. The relative orientation of the represented portion of the spline coupling 10 may vary, for instance due to the rotation of the spline coupling 10 and its placement in its given environment, for example in a gas turbine engine. In use, the rotational velocity of the spline coupling 10 (e.g., centrifugal forces) may cause the lubricating fluid to stick to the bottoms of the female spline teeth 22, and thus the oil level 28 may be consistent throughout the spline coupling 10 regardless of the relative orientation of the represented portion of the spline coupling 10 with respect to gravity. One or more mechanical seals such as an O-ring 30 may be provided at the second or distal end of the spline coupling 10 to seal the spline coupling 10 downstream of the one or more drainage holes 26 relative to the location at which the injector 24 injects lubricant (in this embodiment oil) into the spline coupling 10, thus ensuring that the lubricating fluid is evacuated through the one or more drainage holes 26. Other sealing means may be considered as well.

Referring additionally to FIG. 2A, there is shown a female spline tooth 22a having a top land surface 32a and tooth flanks 34a, and is surrounded by lubricating oil 28. The tooth 22a has a trapezoidal shape, but it could have other shapes as well, such as rectangular. As discussed above, grooves 36a between the female spine tooth 22a are aligned with corresponding male spline teeth 20 for coupling engagement therebetween. As such, the grooves 36a may be shaped to generally correspond to the shapes of the male spline teeth 20. In the embodiment shown in FIG. 2A, the grooves 36a are substantially flat. In other embodiments, the grooves 36a may be concavely shaped to accommodate male spline teeth 20 having rounded or pointed edges (not shown). In other embodiments, the grooves 36a may be shaped to create a space or gap between their surfaces and the edges of the male spline teeth 20 to allow lubricating fluid to more easily pass. The widths of the grooves 36a may generally correspond to the widths of the top land surfaces of the female spline teeth 22a. Other shapes and sizes of the grooves 36a may be considered as well. While the oil 28 is shown at a level such that the entire tooth 22a is fully submerged, the oil level 28 may vary while the spline coupling 10 is in use due to numerous factors, as discussed above. Many of the female spline teeth 22 on the female spline member 16, in some embodiments the majority of the female spline teeth 22, are substantially similar to the female spline tooth 22a shown in FIG. 2A and thus have a substantially similar tooth height $H_a$ to the female spline tooth 22a. This tooth height $H_a$ may be defined by a distance between the top land surface 32a and the base of the female spine tooth 22a. While lubricating oil 28 may pass around the female spline tooth 22a through grooves 36a to provide it with lubrication, the female spline tooth 22a shown in FIG. 2A does not include a drainage hole to evacuate the lubricating oil 28 from the spline coupling 10.

Referring additionally to FIG. 2B, the female spline member 16 includes one or more female spline teeth 22b having a lesser tooth height $H_b$ than the other female spline teeth 22, such as female spline tooth 22a shown in FIG. 2A. The height $H_b$ of female spline tooth or teeth 22b is lesser, reduced or shortened compared to the height $H_a$ of the other female spline teeth such as 22a. This tooth height $H_b$ may be defined by a distance between the top land surface 32b and the base of the female spine tooth 22b. Other points of reference on the female spline member 16, for example an outer surface thereof, may be used to define the tooth heights $H_a$, $H_b$ as well. As illustrated in FIG. 2B, dotted line 38 represents the outline of female spline tooth 22a, demonstrating the reduction in height that led to female spline tooth 22b. In an embodiment, a pre-existing female spline member 16 may be adapted for the purposes of the present disclosure by reducing the height of one or more female spline teeth 22 with a cutter, grinder or other suitable machine tool. Alternatively, a spline coupling 10 may be initially fabricated so that one or more female spline teeth 22b have a lesser tooth height $H_b$ that the other female spline teeth 22. As shown in FIGS. 2A and 2B and as will be discussed in further detail below, the width of the top land surface 32b of the female spline tooth 22b is greater than the width of the top land surface 32a of the other female spline teeth 22a. In the shown embodiment, the flanks 34b of the female spline tooth 22b are similarly angled to the flanks 34a of spline tooth 22a; however the lengths of the flanks 34a are reduced due to the overall height reduction of the female spline tooth 22b. The grooves 36b bordering the female spline tooth 22b are substantially similar to the grooves 36a bordering the female spline tooth 22a, and, in cases where female spline tooth 22a is adjacent female spline tooth 22b, a groove 36a may be one in the same as a groove 36b. Due to the overall height reduction of the female spline tooth 22b, the widths of the grooves 36b may be lesser than the width of the top land surface 32b of female spline tooth 22b.

As discussed above, the spline coupling 10 includes one or more drainage holes 26b that pass through the female spline member 16 and terminate at the top land surface(s) 32b of the one or more female spline teeth 22b having a lesser tooth height $H_b$ than the other non-reduced female spline teeth 22 such as female spline tooth 22a. The diameter of the drainage hole(s) 26b may vary, for example, based on the specific application, the quantity of oil needing to be evacuated, or the number of drainage holes 26b present in a given female spline member 16. An exemplary drainage hole 26b may have a diameter of roughly 0.03", depending on the size of the spline coupling 10. Due to various limitations such as available drilling tools and oil evacuation requirements, drainage holes 26b for such applications typically cannot be drilled with a diameter of less than approximately 0.02".

In various embodiments, the female spline teeth 22a include tooth flanks 34a that converge in a triangular fashion towards narrow top land surfaces 32a that have widths similar to or slightly less than the minimum possible diameters of the drainage holes 26. This may lead to a drainage hole 26 occupying most of the width of the top land surface 32a, leaving sharp and/or fragile edges between the top land surface 32a and the flanks 34a. Alternatively, if the drainage holes 26 were partially or fully drilled into a tooth flank 34a, the openings or apertures would be undesirably oval-shaped. As such, by reducing the height of one or more female spline teeth 22b, the top land surface 32b is made wider than the top land surface 32a of a non-reduced female tooth 22a due to the converging nature of the spline tooth flanks 34b. By increasing the width of the top land surface(s) 32b on the one or more female spline teeth 22b, the drainage hole(s) 26b may be drilled through the one or more female spline teeth 22b and terminate at the top land surface(s) 32b, which is now wide enough to fully accommodate the drainage hole(s) 26b. Such a drainage hole(s) 26b would neither create sharp edges between the top land surface(s) 32b and the tooth flanks 34b, nor be partially drilled into the tooth flank 34b. Advantageously, the drainage hole(s) 26b terminates at a substantially flat top land surface(s) 32b so that the drainage hole(s)' 26b opening is at a substantially consistent height, terminating with a known diameter at a known position. In the present embodiment, although not necessarily the case in all embodiments, the drainage hole(s) 26b meet the flat top land surface(s) 32b at a ninety degree angle. As such, the drainage hole(s) 26b may exit perpendicularly to the top land surface(s) 32b in a known and controlled manner. As an example, in another embodiment, the drainage hole(s) 26b meet the flat top land surface(s) 32b at a midpoint thereof.

In the embodiment shown in FIG. 2B, the height $H_b$ of the female spline tooth 22b is greater than the pitch diameter of the female spline 16, shown as broken line 40. As discussed above, the pitch diameter 40 may affect the level of the flowing lubricating oil 28 in the spline coupling 10. As such, by the height $H_b$ of the female spline tooth 22b being greater than the pitch diameter 40, the female spline tooth 22b having the drainage hole 26b may be fully submerged in lubricating oil 28, facilitating the lubricating oil's 28 drainage through the drainage hole 26b. Other heights $H_b$ for female spline tooth 22b may be considered as well, depending on the operational parameters of the spline coupling 10. For instance, spline couplings 10 requiring higher volumes of lubricating fluid may require one or more drainage holes 26b with greater diameters, and thus necessitating the female spline tooth or teeth 22b to have their height $H_b$ reduced accordingly. The overall shape of the female spline teeth 22 may also affect the required height reduction of the female spline tooth or teeth 22b, as the angle of the flanks 34b will affect the gains in top land 32b width obtained as the height $H_b$ of the female spline tooth 22b is reduced.

As discussed above, the number of drainage holes 26b, their axial positions, and the ratio between non-reduced female spline teeth 22a and female spline teeth 22b having a reduced height $H_b$ will depend on a variety of factors such as the number of female spline teeth 22, the quantity of lubricating fluid required, and the specific application in which the spline coupling 10 is used. Other factors may affect the optimal number of drainage holes 26b as well. For instance, a spline coupling 10 rotating at higher speeds and/or transferring greater loads may require greater quantities of lubricating fluid, and as such may require more drainage holes 26b to evacuate the lubricating fluid. In an embodiment, the optimal ratio of non-reduced female spline teeth 22a to female spline teeth 22b having a reduced height $H_b$ to accommodate drainage holes 26b on their top land surfaces 32b may be eight to one. As such, for a female spline member 16 having nine female spline teeth 22, one may be a female spline tooth 22b having a reduced height $H_b$ to accommodate a drainage hole 26b terminating on its top land surface 32b. Similarly, for a female spline member 16 having eighteen female spline teeth 22, two may be female spline teeth 22b having reduced heights $H_b$ to accommodate drainage holes 26b terminating on their top land surfaces 32b. Other overall numbers of female spline teeth 22 and ratios between non-reduced female spline teeth 22a to reduced female spline teeth 22b accommodating drainage holes 26b may be considered as well. In an embodiment, a plurality drainage holes 26b are disposed circumferentially about the female spline member 16 at the distal end thereof. Other axial and circumferential configurations for spline couplings 10 with more than one drainage hole 26b may be considered as well.

In various cases, the female spline member 16 may include a given number of female spline teeth 22, which may be referred to as 'N' number of female spline teeth 22. In such cases, one 22b of the 'N' female spline teeth 22 may have a tooth height $H_b$ that is lesser than the tooth height $H_a$ of the remaining female spline teeth 22a, i.e. the other 'N−1' 22a of the total 'N' female spline teeth 22. For instance, in such a case where a female spline member 16 were to have twelve total female spline teeth 22, one 22a of the twelve female spline teeth 22 would have a tooth height $H_b$ that is lesser than the tooth height $H_a$ of the remaining eleven 22a of the twelve female spline teeth 22. Other numbers 'N' of female spline teeth 22 may be considered as well.

In other cases, a female spline member 16 may include 'N' number of female spline teeth 22a each have a substantially similar tooth height $H_a$ and an additional female spline tooth 22b having a tooth height $H_b$ that is lesser than the tooth height $H_a$ of the 'N' female spline teeth 22a (thus having a total of 'N+1' female spline teeth 22). For instance, in such a case a female spline member 16 may have thirteen female spline teeth 22a each having a substantially similar tooth height $H_a$ and an additional female spline tooth 22b having a tooth height $H_b$ that is lesser than the tooth height $H_a$ of the thirteen female spline teeth 22a (thus having a total of fourteen female spline teeth 22). Other numbers 'N' of female spline teeth 22a may be considered as well.

In various embodiments, the height reduction of the one or more female spline teeth 22b is done to provide sufficient space between the edges of the drainage hole(s) 26b and the edges of the top land surfaces 32b. In an embodiment, the height $H_b$ of each female spline tooth 22b is reduced to ensure that the width of the top land surface 32b is at least twice as great as the diameter of the drainage hole 26b passing through to ensure the female spline tooth 22b retains sufficient strength and rigidity. For spline couplings 10 transmitting greater torque loads, greater ratios between these dimensions may be suitable. For the female spline tooth 22b shown in FIG. 2B, the width of the top land surface 32b is approximately five times greater than the diameter of the drainage hole 26b.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A spline coupling comprising:
a male spline member having a plurality of male spline teeth;
a female spline member having a plurality of female spline teeth complementary to and engaged with the plurality of male spline teeth, one or more of the plurality of female spline teeth having a tooth height that is lesser than a tooth height of another one or more of the plurality of female spline teeth,
the tooth height of the one or more of the plurality of female spline teeth each defined by a first top land surface of the one or more of the plurality of female spline teeth,
the tooth height of the other one or more of the plurality of female spline teeth each defined by a second top land surface of the other one or more of the plurality of female spline teeth; and
a drainage hole in each first top land surface of the one or more of the plurality of female spline teeth and passing through each of the one or more of the plurality of female spline teeth.

2. The spline coupling as defined in claim 1, wherein the one or more of the plurality of female spline teeth extend radially inwardly beyond a pitch diameter of the female spline member.

3. The spline coupling as defined in claim 1, wherein each drainage hole meets each first top land surface of the one or more of the plurality of female spline teeth at a ninety degree angle.

4. The spline coupling as defined in claim 1, wherein each drainage hole meets each first top land surface of the one or more of the plurality of female spline teeth at a midpoint of each first top land surface of the one or more of the plurality of female spline teeth.

5. The spline coupling as defined in claim 1, wherein the female spline member includes a number of N of the plurality of female spline teeth, one of the N of the plurality of female spline teeth having the tooth height that is lesser than the tooth height of the other number of N−1 of the N female spline teeth.

6. The spline coupling as defined in claim 1, wherein the female spline member includes eighteen of the plurality of female spline teeth, two of the eighteen of the plurality of female spline teeth having the tooth heights that are lesser than the tooth heights of the other sixteen of the eighteen of the plurality of female spline teeth.

7. The spline coupling as defined in claim 1, further comprising an O-ring to seal a distal end of the spline coupling.

8. The spline coupling as defined in claim 1, wherein a width of each first top land surface of the one or more of the plurality of female spline teeth is at least twice as great as a diameter of each drainage hole.

9. The spline coupling as defined in claim 1, wherein the male spline member is disposed on an exterior surface of a drive shaft in a gas turbine engine.

10. The spline coupling as defined in claim 1, wherein the female spline member is disposed on an interior surface of a coupling in a gearbox of a gas turbine engine.

11. The spline coupling as defined in claim 1, wherein a plurality of the drainage holes are disposed circumferentially about the female spline member at a distal end thereof.

* * * * *